Feb. 15, 1966 M. FEINBERG 3,234,959

CHECK VALVE DEVICE

Filed July 19, 1963

INVENTOR.
MAURICE FEINBERG
BY
Blair & Buckles
ATTORNEYS

United States Patent Office 3,234,959
Patented Feb. 15, 1966

3,234,959
CHECK VALVE DEVICE
Maurice Feinberg, 536 Clinton Road, Brookline, Mass.
Filed July 19, 1963, Ser. No. 296,240
2 Claims. (Cl. 137—494)

This invention relates to a valve. More specifically it relates to a fluid mixing valve having provision also for precise volumetric control of the fluid passing through the valve.

Valves of the type here concerned are used to temper a fluid flowing into a tank or reservoir. They are used also to meter and mix different fluids prior to their delivery. The fluids may be liquids or gases or combinations of liquids and gases. Usually these valves comprise a casing having a plurality of inlet passages for connecting to different fluid supply lines, a fluid mixing chamber within the casing and an outlet from the mixing chamber for connecting to a nozzle or tank or reservoir. Normally, the valves have provision for preventing the siphoning or by-passing of fluid from one supply line through the valve to another supply line which tends to occur when there exists a pressure differential between the two lines. This is accomplished by fitting the inlet passages with check valves which remain closed so long as the fluid pressure at the outlet side of the valve remains approximately equal to or greater than that at the valve inlets. However as soon as the pressure at the valve outlet decreases appreciably as when the tank or outlet line with which the valve communicates calls for fluid, these check valves open permitting the free flow of fluid through the valve until the outlet line is closed or the tank is filled, whereupon the pressure again builds up at the outlet side of the mixing valve and closes the check valves.

One difficulty with prior valves of the type with which this invention is concerned is that they do not respond accurately to changing fluid pressure conditions in the system. As a result, fluid passes from one supply line into another, causing contamination of or premature and uncontrolled fluid mixing in one or more of the separate fluid supplies.

A further difficulty with these valves is that they frequently close prematurely before the desired fluid pressure has been reached in the valve outlet passage and hence also before the desired fluid level has been attained in the tank connected thereto. That is, the check valves respond not only to the actual fluid pressure in outlet passage but also to transient and false indications thereof. These transient indications are caused primarily by the fluid flowing through the valve which is found to well up behind and thereby to temporarily close the check valves so as to cause those to chatter or oscillate between the open and closed positions.

In addition to closing prematurely, the check valves in the prior devices are driven to the closed position extremely rapidly so that the device is subjected to considerable mechanical stress, and the valves and valve seats become excessively worn after a relatively short time in use, and so leak. Also the sudden jarring closing of the valves sets up shock waves in the fluid being mixed and delivered which greatly strain the pipes, couplings and connections associated with the valve.

These prior valves are disadvantaged also because they do not provide for accurate control or metering of the fluid flowing therethrough. Or if they do, they rely on such elaborate metering devices as needle valves which must be calibrated or set to provide said control. Resultantly the initial cost of these valves is quite high and they require constant preventative maintenance and repair to keep them operating properly.

Accordingly, it is a principal object of this invention to provide an improved fluid mixing valve which opens and closes precisely and only at the proper times to prevent by-passing of fluid from one inlet line to the other. With the instant device the problem of valve chattering is eliminated.

Still another object of this invention is to provide a fluid mixing valve which is extremely inexpensive and easy to manufacture and reproduce and whose fluid control characteristics can be preset at the factory and changed easily in the field.

It is a further object of this invention to provide a fluid mixing valve which does not produce shock waves or water hammer during normal operation and whose parts undergo a minimum strain and wear and which requires during its life substantially no preventative maintenance or repair.

Other objects of this invention will be obvious and will in part appear hereinafter.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which.

Figure 1:
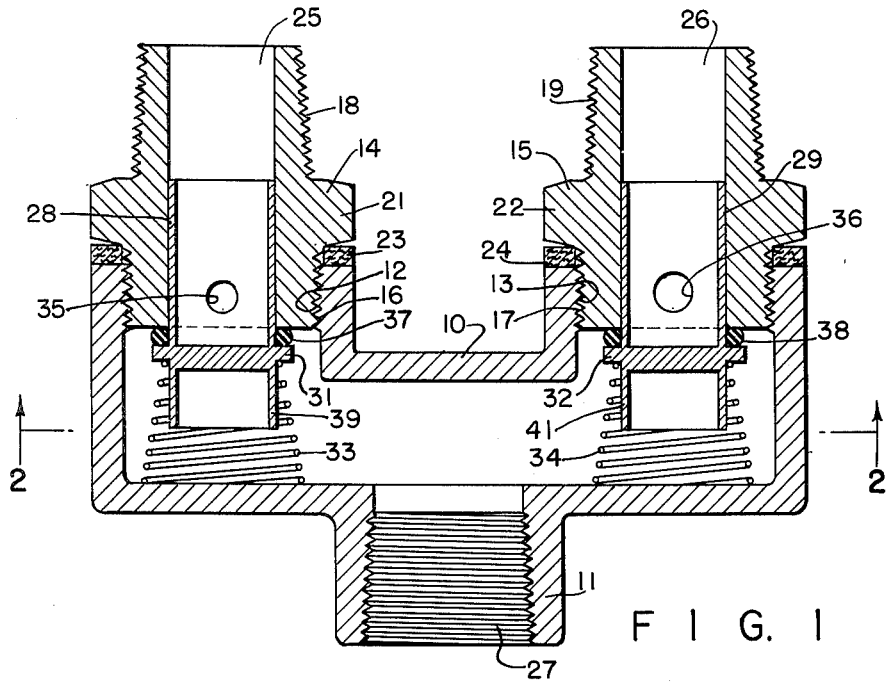
FIG. 1 is a vertical section of a fluid mixing valve embodying the features of my invention, and with the check valves shown in the closed position.
Figure 2:
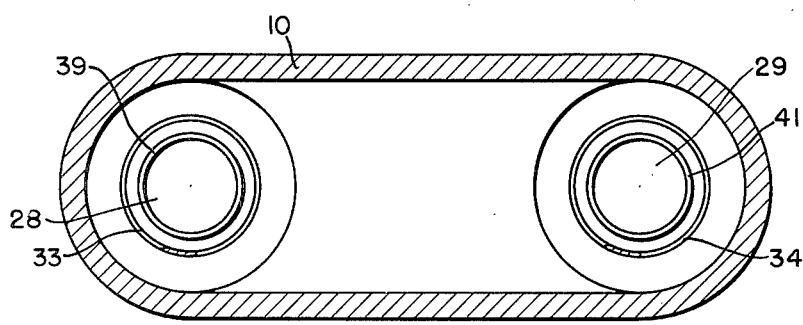
FIG. 2 is a view along line 2—2 of FIG. 1.

Referring to the drawing in FIGS. 1 and 2, the valve comprises a hollow, generally Y-shaped casing indicated at 10. Casing 10 has an interiorly threaded hollow leg 11 adapted to be screwed onto a suitable threaded connection leading to the tank or reservoir containing the fluid whose temperature or mixture is to be controlled. The casing 10 has also a pair of interiorly-threaded access openings 12 and 13 through which the interior elements of the valve may be inserted.

A pair of similar tubular coupling members 14, 15 are provided whose one end portions 16, 17 respectively are exteriorly threaded and screwed into the access openings 12, 13 respectively of casing 10. The opposite end portions 18, 19 of coupling members 14, 15 respectively are also exteriorly threaded and are adapted to be connected to separate sources or supplies of fluid under pressures above atmospheric. Both coupling members 14, 15 are formed intermediate their ends with annular hexagonal flanges 21, 22 respectively, which both facilitate and limit the screwing of members 14, 15 into casing 10. Desirably, a pair of gaskets 23, 24 are fitted over threaded coupling portions 16, 17 respectively to lie adjacent flanges 21, 22 for preventing leakage at the junctions of those members and casing 10 when the valve is fully assembled and in use.

Still referring to FIG. 1, when coupling members 14, 15 are properly seated within casing 10 they form a pair of separate inlet passages or bores 25, 26 extending from the free end of those members approximately to the bottoms of access openings 12, 13 respectively within casing 10. These inlet passages are seen to communicate with each other and with an outlet passage 27 within leg 11.

In accordance with the invention, means are provided for very accurately controlling the amount of fluid flowing from each of the inlet passages 25, 26 to outlet passage 27. The fluid control means are shown more particularly to comprise a pair of similar tubular sleeve members 28, 29 for positioning within casing 10 before coupling members 14, 15 are screwed in place. Sleeve members 28, 29 are closed at one end and are arranged and adapted to be snugly, but slidably received in passages 25, 26 respectively with their closed ends facing the interior of casing 10. The members 28, 29 are formed with annular flanges 31, 32 respectively located adjacent the closed ends thereof to limit the extent to which the sleeve members 28, 29 slide into their corresponding passages 25, 26 and also to function as spring stops as will be described more particularly hereinafter.

A pair of frustro-conical coil springs 33, 34, are compressed between the aforementioned flanges 31, 32 respectively and the wall of casing 10 to bias the sleeve members 28, 29 away from said wall and into passages 25, 26. Springs 33, 34 are fairly light, producing a biasing force in the order of only a few ounces, so that when the fluid pressure at an inlet passage say passage 25, exceeds the fluid pressure in outlet passage 27, the sleeve member 28 retracts or is pushed partially out of passage 25 toward the wall of casing 10. The individual coils of the conically shaped spring 33 fit inside one another on being compressed permitting the free sliding movement of member 28.

A pair of fluid discharge orifices 35, 36 are formed in the side walls of sleeve members 28, 29 respectively upwardly from the closed ends of those members to provide separate fluid passages through the valve. The sizes of these orifices determine the rate at which fluid flows from each inlet 25, 26 into the outlet passage 27, and their relative size determines the relative amounts of the two incoming fluids that are mixed together within the valve for delivery to the tank or reservoir with which the valve communicates. Normally, the orifices 35, 36 are cut at the plant prior to assembling the valve. However, they may be just as easily be cut to order in the field by simply disassembling the valve and drilling the orifices to suit the particular need. In any event, the actual sizes of the orifices 35, 36 depend, of course, on the flow rate desired as well as the viscosities, temperatures, and pressure differential of the two incoming fluids and the desired resultant mixture.

Normally the sleeve members 28, 29 assume a closed position within their corresponding passages 25, 26 due to the bias afforded by springs 33, 34 respectively. In this position the orifices 35, 36 are completely blocked by the walls of passages 25, 26 and no fluid flows through the valve. A pair of O-ring seals 37, 38 are fitted about the sleeve members 28, 29 respectively and these are squeezed between flanges 31, 32 respectively and the ends of coupling members 14, 15 respectively to prevent leakage at the sliding joints between the sleeve members and their corresponding coupling members whenever members 28, 29 are in the closed position.

Figure 3:
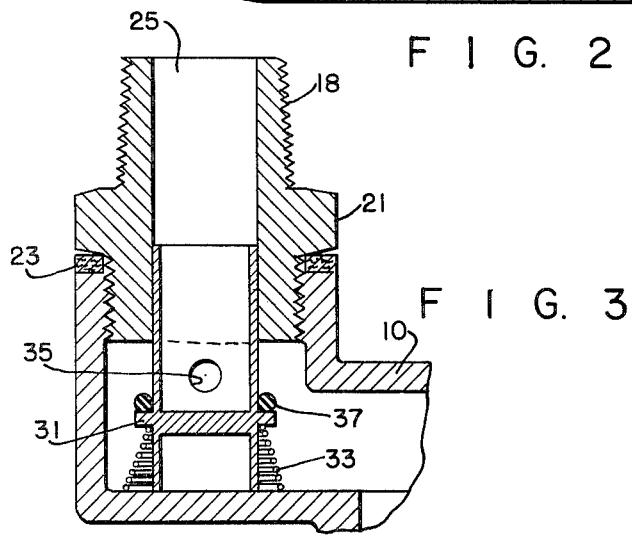
FIG. 3 is a vertical section of a portion of the apparatus of FIG. 1 showing the check valve in the open position.

However and now referring to FIG. 3, when an appreciable pressure differential develops between the fluid at the inlet and outlet sides of the valve, one or both sleeve members 28, 29 is pushed partially out of its passage thereby unblocking its corresponding orifice and permitting fluid to flow therethrough to the valve outlet 27 at a carefully controlled or metered rate. The sleeve members remain in the open position until the fluid pressure at the outlet side of the valve again approximately equals that at the valve inlets whereupon the sleeves 28, 29 are again driven to the closed position by their corresponding springs 33, 34.

It is a feature of this invention that means are provided to make the sleeve members 28, 29 unresponsive to transient fluid pressure conditions arising in the outlet side of the valve as are caused by the temporary welling up or backing up of fluid within the valve casing. More particularly, sleeve members 28, 29 are fitted with a pair of cylindrical skirts 39, 41 respectively extending out from the closed ends thereof coaxially with springs 33, 34 respectively and toward the wall of casing 10. The length of skirts 39, 41 are such that the sleeve members are free to retract from their respective passages sufficiently to completely open orifices 35, 36 before the skirts engage the wall of casing 10. Yet, they are still long enough to engage the casing wall before the springs 33, 34 have fully compressed thereby considerably reducing the strain on the springs and the likelihood of their fatigue distress.

Still referring to FIG. 3, when the sleeve members 28, 29 are in the fully open position, the skirt members 39, 41 engage the wall of casing 10 and close off the regions below the bottoms of the sleeve members between the members and the casing wall. Resultantly fluid is unable to well-up under the sleeve members and cause valve chattering by temporarily driving the sleeves to the closed position. Also since fluid is excluded from the underside of the sleeve members the forces acting parallel to the sliding axes of the members 28, 29 and tending to move the members to the closed position are quite small. Resultantly the pressures at the inlet and outlet sides of each sleeve member must always equalize before the sleeve members will move to the closed position under the influence of springs 33, 34. It will be apparent also that the sleeve members 28, 29 are pushed to the closed position fairly slowly and uniformly only by their springs. More particularly, so long as the pressure at the inlet side of the valve exceeds that at the outlet side, the sleeve 28 will remain in its retracted FIG. 3 position. However, even when the fluid pressure at the outlet side of the valve builds up, there is no immediate effect on the sleeve 28 since substantially all of the forces due to the fluid in the valve outlet are directed against the side of the sleeve 28, (i.e., perpendicular to its sliding axis).

Further, the pressure at the outlet side of the valve never appreciably exceeds that at the inlet side because the inlet and outlet pressures equalize through the orifice 35. Thus, assuming for the moment that skirt 39 actually seals water out from the underside of the sleeve 28, the sleeve 28 would never close no matter how great the pressure at the outlet side of the valve became since all of the forces acting along the sliding axis of the sleeve would be downward.

Actually, in practice, the skirt 39 does not provide a permanent seal against the bottom wall of the casing. Fluid gradually seeps into the space within the skirt 39 reducing the net downward force of the fluid against the sleeve 28 tending to keep the sleeve in its retracted position. At some point, this net downward force falls below the upward force on the sleeve due to spring 33 whereupon the spring pushes the sleeve relatively slowly and uniformly to the closed position as stated in the specification. It is important to note too that when the valve does close, the fluid pressures at the inlet and outlet sides of the mixing valve are substantially equal. The closing of the valve is brought about solely by the action of spring 33. There is no additive closing force produced by the outlet fluid pressure. Thus there can be no premature or temporary closing of either sleeve member 28 or 29 as would upset the desired mixing ratio. Accordingly, the O-ring seals 37, 38 are not worn or deformed appreciably when the valve closes, and no shock waves are set up in the fluid to strain the pipes and couplings associated with the valve.

It is a feature of this invention that the same valve may be used equally effectively to meter and mix liquids having widely differing viscosities, or gases or combinations of the same. For example, the instant valve can be used to control the mixing and delivering of two kinds of gasoline. Also, it may be used to controllably mix and regulate the flow of oxygen and acetylene, for example, in torch welding applications. And it is contemplated within the scope of this invention that the instant valve construction may include if desired more than two inlet lines to effect controlled mixing of any number of different types of fluids with each inlet passage being fitted with a check valve of the type herein described. For example, the instant valve can even be employed to meter and mix several different colored paints, a liquid solvent and air for delivery to a spray nozzle.

It will thus be seen that the objects set forth above, among those made apparent from the preceeding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

I claim:

1. A fluid check valve comprising a hollow casing, a fluid inlet passage spaced opposite one wall portion of said casing, a fluid outlet passage communicating with said inlet passage, a tubular sleeve member slideably received within said passage, said member being closed at the end thereof facing said wall portion, a peripheral flange extending around the closed end of said member, means defining a fluid metering orifice in the side wall of said member upwardly from said flange, a frustroconical coil spring compressed between said flange and said casing wall portion for biasing said member away from said wall portion and a tubular skirt projecting from the closed end of said member toward said casing wall portion, the spacing between said skirt and said wall portion being greater than the spacing between said metering orifice and the end of said inlet passage within said casing.

2. A check valve for use in a fluid mixing valve assembly with a plurality of inlet passages and an outlet passage comprising a casing having an inlet passage, an outlet passage and a wall portion opposite said inlet passage, a tubular sleeve member slideably received in said passage, said sleeve member being closed at the end thereof facing said wall portion, means defining a fluid metering orifice in the side wall of said sleeve member spaced from the closed end thereof, means for biasing said member into said passage and away from said casing wall portion and an integral sleeve extension protruding from the closed end of said sleeve member toward said casing wall portion, said extension engaging said casing wall portion when said sleeve member is retracted from said passage in opposition to said biasing means so as to exclude fluid from the region between said closed end of said sleeve member and said casing wall portion.

References Cited by the Examiner

UNITED STATES PATENTS

| | | | |
|---|---|---|---|
| 1,091,238 | 3/1914 | Perkins | 137—543.13 X |
| 1,291,939 | 6/1914 | Laubach | 137—606 |
| 2,679,858 | 6/1954 | Kemp | 251—284 X |
| 2,807,336 | 9/1957 | Sweeney | 137—514.50 X |
| 2,820,475 | 1/1958 | Hobbs | 137—538 X |

FOREIGN PATENTS 709,847   6/1954   Great Britain.

MARTIN P. SCHWADRON, *Acting Primary Examiner.*

M. CARY NELSON, *Examiner.*